(12) United States Patent
Tracy

(10) Patent No.: US 6,491,265 B2
(45) Date of Patent: Dec. 10, 2002

(54) SELF LOCKING BI-DIRECTIONAL LOCK/ RELEASE FIXTURE

(76) Inventor: David S. Tracy, R.R. 7 Box 575, Augusta, ME (US) 04330

(*) Notice: Subject to any disclaimer, the term of this patent is extended or adjusted under 35 U.S.C. 154(b) by 2 days.

(21) Appl. No.: 09/727,081

(22) Filed: Nov. 30, 2000

(65) Prior Publication Data

US 2001/0000617 A1 May 3, 2001

Related U.S. Application Data

(63) Continuation-in-part of application No. 08/583,275, filed on Jan. 5, 1996.

(51) Int. Cl.[7] ........................... A47G 23/02; A47K 1/08
(52) U.S. Cl. .................... 248/154; 248/311.2; 248/313; 248/131
(58) Field of Search .............................. 248/154, 311.2, 248/686, 687, 220.21, 221.11, 222.12, 222.13, 222.51, 222.52, 223.41, 224.7, 229.21, 310, 316.2, 313; 224/42, 38

(56) References Cited

U.S. PATENT DOCUMENTS

| | | | |
|---|---|---|---|
| 1,424,607 A | * | 8/1922 | Wisenberg |
| 2,850,079 A | * | 9/1958 | Prushnok et al. |
| 3,129,569 A | * | 4/1964 | Ballantyne |
| 3,542,178 A | * | 11/1970 | Ripple |
| 3,633,863 A | * | 1/1972 | Abbey |
| 3,891,171 A | * | 6/1975 | Samuelian et al. |
| 4,040,549 A | * | 8/1977 | Sadler |
| 4,756,497 A | * | 7/1988 | Lan |
| 5,022,549 A | * | 6/1991 | Beaver |
| 5,054,733 A | * | 10/1991 | Sheilds |
| 5,071,096 A | * | 12/1991 | Hartman et al. |
| 5,143,338 A | * | 9/1992 | Eberlin |
| 5,390,887 A | * | 2/1995 | Campbell |
| 5,490,653 A | * | 2/1996 | Ingwersen ............... 248/311.2 |
| 5,560,578 A | * | 10/1996 | Schenken et al. ........... 248/313 |
| 6,267,340 B1 | * | 7/2001 | Wang .................... 248/231.21 |

* cited by examiner

*Primary Examiner*—Anita King
(74) *Attorney, Agent, or Firm*—Stan Jones, Patents

(57) ABSTRACT

Invention provides a self latching, object-holding fixture designed to release a held object whenever the object is turned slightly in either direction. Fixture has a shaped housing and the object to be held has a mated opening of a similar matching shape. Placing an object to be held locks the object to the fixture by spring-loaded latching action. The fixture housing covers a fixed spring holding base that is anchored by any suitable means to a support surface. Covering that fixed-position base, except for exposed spring-loaded keeper latches, is a rotatable casing having a pair of spring compression cam surfaces carried by the casing. Using a cam follower action, these cam surfaces selectively cause the spring to collapse in response to the rotation of the casing holding in either direction of casing rotation. As the object/casing is turned slightly, this cam follower/spring collapse action releasably disengages the keepers from the object being held.

26 Claims, 9 Drawing Sheets

SELF LOCKING BI-DIRECTIONAL LOCK/RELEASE FIXTURE

BACKGROUND OF THE INVENTION

This continuation-in-part application is from my presently pending parent application of the same title filed on Jan. 5, 1996 having Ser. No. 08/583,275.

FIELD OF THE INVENTION

The field of the invention relates to a new and improved lock/release method and a self-locking/bi-directional, turn-release fixture. More specifically, the field relates to a bi-directional striker actuated release for such a locking fixture, and particularly to such a fixture that will release a locked device by a slight turn applied to the locked device in either a clockwise or counter clockwise direction.

The specific field of the invention as described herein relates to an environment of travel containers for a vehicle, but other environments such as spice racks, shipboard use holders, toys and the general latch/release field will equally benefit from the principles of this novel invention

DESCRIPTION OF PRIOR ART

In today's society, our fast paced and hectic travel requirements, have made drinking coffee and other liquids in a vehicle an everyday occurrence. Every commuter has noticed, in an adjacent expressway lane, that his fellow commuter is drinking morning coffee on the way to work. Service and comfort stations, generally catering to such travel demands, display a wide variety of travelling containers. The particular lock/release fixture of this invention, while it is no means so limited, is described in such a travelling container environment.

A search was done and that search has disclosed a number of related references, some of marginal relevance, which will be discussed hereinafter. The references disclose a diverse number of method and apparatus for travel mugs and fixtures for holding same. Generally speaking, the search reveals that various designs of travel mugs and bases for use in a vehicle, together with some way for stabilizing a container in place on a base are well known. Additionally, some of the prior art seeks to provide structure aimed at preventing spillage.

None of the search references, however, demonstrate the integrated, novel features of this invention which provide a simple way to self lock a travel mug by placing the mug unto a mug-holding fixture, together with a simple release of that mug for removal from its locked position. A divided latch keeper pair is bi-directionally spring loaded for self latching and a spreadable release in either rotational direction.

The prior art developed by the search included the following patents:

| | | |
|---|---|---|
| 4,040,549 | August 9, 1977 | Sadler |
| 5,172,457 | December 22, 1992 | Allen et al |
| 5,390,887 | February 21, 1995 | Campbell |
| 4,756,497 | July 12, 1988 | Lan |
| 4,801,060 | January 31, 1989 | Thompson |
| 5,029,720 | July 9, 1991 | Bridges |
| 4,915,239 | April 10, 1990 | Persch |
| 1,759,140 | May 20, 1930 | Silberger |
| Des. 344,385 | February 15, 1994 | Przytulla |
| Des. 293,954 | January 26, 1988 | Moore |
| Des. 271,342 | November 8, 1983 | Templeton |
| Des. 276,499 | November 27, 1984 | Kamada et al |

Each of the patents will now be reviewed, taking the patents of the search in the order listed above:

| | | |
|---|---|---|
| 4,040,549 | August 9, 1977 | Sadler |

Sadler shows two protruding ears located near the bottom of a mug in combination with a coin holder cap which fits over a base. An upstanding circular track receives a cup bottom and has located therein a pair of opposed tapered slots for engagement with the cup ears for holding the cup in place. Turning the cup frictionally holds the cup in place to prevent spillage. This reference discloses cup holding, but does not suggest a centrally located nut nor the split keeper latching and/or unlatching features of the present invention.

| | | |
|---|---|---|
| 5,172,457 | December 22, 1992 | Allen et al |

Allen et al discloses a funiary urn that is seated in cross-shaped uprights and is attached to a base by a central bolt 64. (Please see FIG. 4.) This airtight container is not for the same purpose and is clearly distinguishable from the present invention. Note in particular that there is no teaching, desire, nor need to turn about ⅛th of a turn—right or left—for unlocking purposes.

| | | |
|---|---|---|
| 5,390,887 | February 21, 1995 | Campbell |

Campbell shows an adjustable circular base with upstanding velcro straps for holding a beverage container. Campbell also shows a base structure having hooks and elastic bands for attachment to a carpet or seat of a vehicle. Other than some superficial resemblance as to shape, this reference is not relevant to the structure or concepts of the present invention.

| | | |
|---|---|---|
| 4,756,497 | July 12, 1988 | Lan |

Lan discloses a suction cup base that provides a non-turnover support system for a cup, glass, etc. A flexible cupule 2 hooks with a series of containers 31 and 32 that receive an object 5 to be held. Both the structure and method of the present invention are markedly different than that disclosed by Lan. In particular, there is no teaching or suggestion in Lan of any form of self locking and/or unlocking by turning, much less any split striker latching operation for a bi-direction rotational release.

| | | |
|---|---|---|
| 4,801,060 | January 31, 1989 | Thompson |

Thompson discloses a wedge shaped base to hold a drinking vessel upright on sloping seats. A notch and recess lock is shown in FIG. 8 of Thompson. This approach does not suggest a self locking/slight-turn-unlocking feature of the present invention.

| 5,029,720 | July 9, 1991 | Bridges |

Bridges shows a raised track 31, FIG. 4, having a guiding bead 32 on a base 33 for guiding the bottom of a cup 10 into a recess in base 33. The cup has an outer ring 21 near its bottom 34 as shown in FIG. 1. The purpose of the Bridges ring 21 and guide track 31 is to center a cup over the recess so that it can drop safely into that recess. This art, centered as it is on guiding for a free drop of the cup, does not teach or suggest any split striker keeper latching or self locking and/or unlocking by a small turn in either direction as provided by the present invention.

| 4,915,239 | April 10, 1990 | Persch |

Persch discloses a bottle dispenser for specially shaped bottles 4 having a tapered foot 5. The Persch base 1 has two rotating disks with apertures in each, and these disks, or stars, as Persch calls them, form a locking device for grasping the bottle near the tapered foot of the bottle. A blind bore 25, pressure spring 27 and ball 26 stops the rotating stars in either a removal or locked position for the bottles.

| 1,759,140 | May 20, 1930 | Silberger |

Silberger discloses a conventional lazy susan type spice rack having a central spindle and two tiers for holding spices that can be rotated into position for easy handling. This reference is not relevant to the present invention.

| Des. 344,385 | February 15, 1994 | Przytulla |
| Des. 293,954 | January 26, 1988 | Moore |
| Des. 271,342 | November 8, 1983 | Templeton |
| Des. 276,499 | November 27, 1984 | Kamada et al |

These four design patents are mostly relevant for showing types of container designs that have been patented by others. None of them are particularly relevant to the structure of the present invention.

In my pending parent Application the Examiner did a search and found many of my claims allowable over the following references:

| 3,633,863 | January 11, 1972 | Abbey |
| 2,850,079 | September 2, 1958 | Prushnock et al |
| 5,071,096 | December 10, 1991 | Hartman et al |
| 5,022,549 | June 11, 1991 | Beaver |
| 5,490,653 | February 13, 1996 | Ingwersen |
| 5,143,338 | September 1, 1992 | Eberlin |
| 5,054,733 | October 1991 | Shields |

In summary, the conceptual approach underlying this invention relies upon different operating principles than those disclosed by the above listed art. A divided striker keeper is not disclosed nor is there any reliance in the art on turning a held object in order to initiate a desired release by use of a spring loaded divided keeper. None of the references teach or suggest that a bi-directional turn of a held object will cause cammed unloading of a latching spring in order to cause a pair of latch keeper halves to release a held object.

SUMMARY OF THE INVENTION

This invention provides a self latching, object-holding fixture that is designed to self latch. Further, it is designed to self release an object when the object is turned slightly in either rotational direction. The inventive fixture has a shaped housing with the object being held, having a mated opening of a similar matching shape. Placing the object and the matching housing together causes the object to become latched. Rotating the object in either direction through a limited arc causes the object to become unlatched.

The housing covers a spring holding base that is anchored to an external support surface by any suitable means (central bolt or by peripheral screws, for example).

A limited-arc rotatable casing covers that fixed-position base. Exposed spring-loaded keeper sections project from openings in the casing. The rotatable casing may have up to three or more pairs of independent spring compression cam surfaces located on its interior underside. One each of these rotating cam surfaces, depending upon the direction of rotation, serves to releasably disengage the object being held as the object—and therefor the casing—is rotated by a user.

The fixture of the invention includes, on the fixed base, a mounting recess for anchoring a pair of spring-loaded striker keepers with an exposed downwardly inclined leading edge. A forward edge of the striker keepers projects through and slightly beyond a side opening in the casing. This striker, for self latching purposes, is adapted for back and forth sliding movement into and out of the casing when an object (such as a container, for example) is placed over the casing.

The split keepers, during a self-latching mode of operation, slide in concert inwardly as a unit; and, under urging of spring loading on the striker, automatically self lock an object in place. The surrounding casing, which houses the spring and striker mechanism, rotates in either direction on a fixed supporting base. Arc limiting stops in the form of shoulders in arcuate openings of a rotatable plate provide for limited-arc rotation of this housing. At these limit positions the previously held object is in an unlocked— or free-to-remove—position.

Each keeper is split into two halves, and each half is adapted for movement in opposite and spreadable directions. These keepers are spring biased such that they may move apart and become concealed within the casing—as the casing is rotated—so that the object is freely released from a locked position.

Keeper halves are moved in opposite directions by a cam that moves one halve away from the other as the casing turns. Thus, one keeper half of the pair is moved in response to a cam contact against one side of a figure-8 shaped latching spring. This cam is adapted to ride against and compress that keeper's spring surface as the casing is rotated. A side opening in the casing, as the casing turns, conceals the other keeper halve. Thus, the keepers—in response to a casing rotation in either direction—unlocks the previously locked-in-place object.

In one embodiment the latching spring and split keeper pair are formed from a split flexible loop spring that has been turned back upon itself into a shape resembling a figure eight. This figure eight spring configuration has both a closed loop and a split loop section formed by an overlapping spring intersection. The closed loop is located in a fixed housing recess positioned toward the center of the casing, while the split loop section is located outboard near the casing periphery where the keeper pair are exposed beyond a forward edge of the side opening.

The fixed support base also includes an interior stop post that is located just beyond the intersection of the figure eight loops. That stop post both compresses the spring and positions two opposed bias spring arms with sufficient tension that the split keeper sections are normally biased together and compressibly held for unitary sliding movement during self locking. This stop post in one embodiment has a T shaped top for added support and strength. Direct or torque-causing loads on a latched object are strongly resisted by a transverse wing on the top of the stop post.

As the casing rotates—via a latched object as turned by a user—one half of the figure eight spring collapses away from the stop post, and the other half is prevented from moving by the stop post. That other half is encompassed by the turned casing. In so doing, the locking spring tension has been sufficiently altered that the object is freely released from its formally locked position by the casing cam action described below.

The above-described spring collapse is caused by an interior casing cam which rides against one spring bias arm in a direction that tends to move the keeper pair apart, and concurrently moves the cammed keeper inwardly. Such casing and cam movement further moves the keeper sections apart as the arc of the rotation increases. When the spring has compressed sufficiently—and the casing has rotated over the non-collapsing spring section—both keeper halves are fully concealed within the casing.

Accordingly, the locking striker edges are no longer in a position of contact with the striker plate, or puck, on the object and the object may be lifted free of the fixture nut. Upon so doing, the spring tension causes the casing to automatically rotate back to its starting position with keeper edges exposed so that the fixture is ready to again repeat the whole process.

As research continued on my invention—and destructive tests on pre-production models were done—some plastic part breakage was experienced under extreme loads. I therefore developed a further embodiment of my invention that withstands those extreme loads without breakage.

I discovered that a side load on a held object was an adverse condition. Such a load (depending on the height of the object experiencing the load) caused a large moment arm force which might result in part breakage. This drawback was cured by T-shaped anti-torque stop pins having transverse wings at the top of the stop posts. Such posts are located directly on the mounting base. The keeper spring pairs were held under the wing of the stop pin and the breakage did not take place. However, this correction—as more and more tests were done—revealed another problem relating to direct pulls on a latched object.

As larger pull loads were applied, such loads would deform and deflect the bottoms of the keeper pairs upward, and the mating edge of the puck downward, creating unintended sloping surfaces. These large load tests of direct pull on the latched object, combined with the above-noted deflected surfaces overcome the overlapped spring tension and force the striker keeper pairs open. Upon application of sufficient force the keepers withdrew into the casing and resulted in a premature release. A mating notch and ridge interlocks the keeper strikers and the casing openings, and that interlock solved the premature release problem.

Keeper interlocks on the strikers and casing openings—one per keeper pair—take the form of mating recess and keeper ridges which become mutually engaged during a direct pull. Thus, a pair of raised ridges or teeth on the upper surface of a keeper pair engages with a matching mating recess in the underside of the top casing opening that houses the keeper pair. These interlocks serve an anti-spread function that prevent the keepers from spreading apart and/or retracting under high direct pull loads. Such spreading otherwise results in an undesired release. This refinement, though seemingly small in structure, has increased the load resistance of my invention several fold, and makes it a secure lock under dynamic load conditions.

OBJECTS OF THE INVENTION

It is an object of the present invention to provide a lock/release fixture that easily self-locks an object in place.

It is another object of the present invention to provide a releasable fixture which may be released by a slight turn in either a clockwise or counter clockwise direction.

It is yet another object of this invention to provide a self locking bi-directional lock/release fixture capable of safely and conveniently holding a drinking container in a vehicle for release by either a left or right handed passenger.

It is a further object of this invention to provide a pair of spring loaded, side-by-side locking/release keepers, which keepers are responsive to a rearward movement resulting from downward contact by a piece to be locked for automatically seizing the piece in a self-locked condition.

It is still another object of this invention to provide a pair of spring loaded, side-by-side locking/release keepers, which keepers are responsive to a cam follower movement and housing concealment for latch release.

It is another object of this invention to provide a self locking/turn release container that is adapted to hold a mug, bottle or can in a non-spillable condition in a vehicle.

It is yet another object of this invention to employ spring loaded divided latch keepers and a cam collapsed spring for release of an object being held.

It is still one further object of this invention to employ anti-spreading mating surfaces on a keeper pair to absorb greater direct pulls without experiencing any part breakage.

It is yet one further object of this invention to provide anti-torque wings on locking pins in order to absorb greater amounts of load applied to a held object.

It is a further object of this invention to locate a winged pin over latched keeper springs in order to absorb greater loads on a held object without experiencing part breakage.

It is a further object of this invention to provide ridged keeper pairs for additional locking against increased loads.

It is a further object of this invention to provide a fitted notch in the casing to receive ridged keeper pairs for additional locking.

It is a further object of the invention to provide a fitted notch of limited width relative to keeper ridges which prevents spreading under load.

It is a further object of the invention to provide a keeper pair ridges, mating casing notches which prevent keeper retraction under load.

DESCRIPTION OF THE PREFERRED EMBODIMENT(S)

Figure 1:
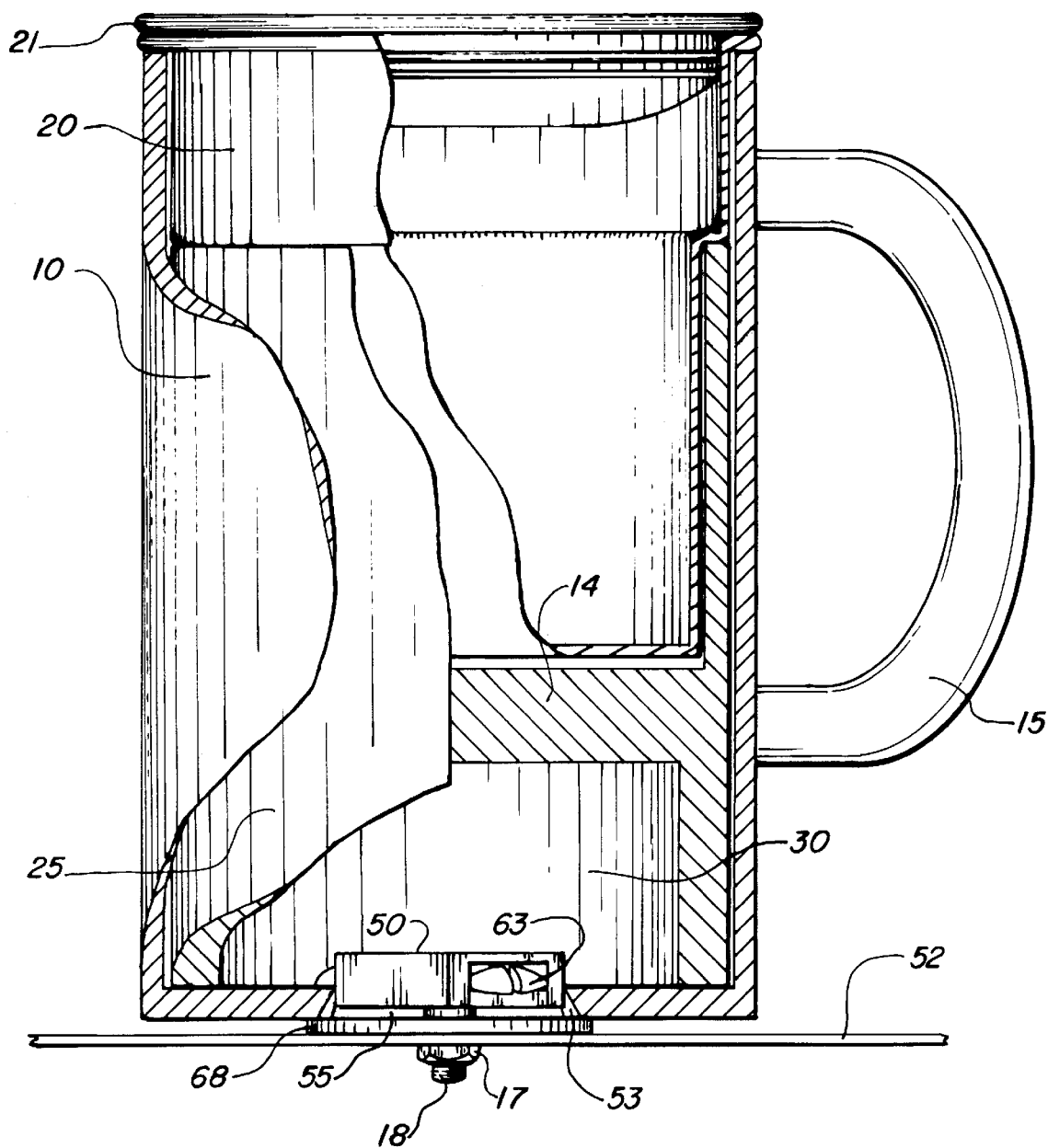
FIG. 1 shows an elevation, partial sectional view of a lock/release fixture in accordance with this invention, which fixture is holding, for example, a travel container.

Turning now to FIG. 1, a cutaway sectional view depicts an outer container 10 having a handle 15, shown schematically, a removable mug 20, lid 21 and adapter insert 25. This container 10 may be made of any suitable material and may, or may not, be insulated as desired. Located within the container 10 is an adapter insert 25 that is normally seated against the bottom of container 10 in one of two possible directions. Mug 20 fits within insert 25 as shown.

Figure 6:
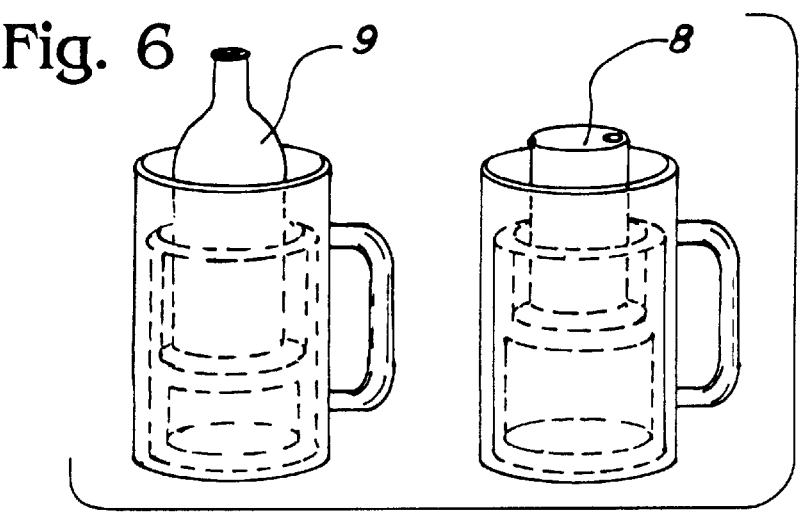
FIG. 6 shows an alternative use of the invention for holding either a can or a bottle.

Insert 25 is a double open-ended cylinder having two separate different diameter recesses of varying depth between the open end and a dividing partition 14 separating the cylinders. The diameters, depth and wall thickness of adapter 25 are chosen such that insert 25 can accommodate different-sized cups, cans or bottles within the outer container 10. FIG. 6 shows the adapter insert 25 as being capable of holding either a can 8 or a bottle 9.

Insert 25 is placed in container 10 in either one or the other of a pair of inverted positions in order to accommodate whatever container type the user may have selected. The user thus picks the appropriate depth and diameter for insert 25 so that either a cup 20, a can 8 or a bottle 9, FIG. 6, may be held within container 10.

In either one of the inverted positions for insert 25, however, a housing cavity 30 is available in adapter 25 to receive fixture 50 of this invention. This enlarged fixture-receiving cavity 30 is formed within the bottom section of container 10, and cavity 30 is located above an upwardly protruding similarly shaped hexagonal male nut 50.

Fixture 50 is herein termed a self locking, two directional locking/release nut since it readily holds a container locked in place and easily releases the held object, such as container 10. Container 10, in view of the environment described for my invention, is sometimes also referred to herein as a mug 10. It is my intention to market the invention under the Tradename MUG NUT™. Particularly useful for holding coffee cups, soda cans or bottled drinks in an automobile, my invention under my adopted Trademark, will be readily available as an after market attachment or for use in new or used automobiles. My invention, however, is not so limited in use.

As shown in FIG. 1, the fixture, or nut 50, is intended to be mounted on a support surface 52. Such a surface may be, for example, an arm rest, console, dash, seat or other suitable area of a vehicle. Mounting may be accomplished in any one of several ways. For example, FIG. 1 depicts a threaded bolt 18 passed through a suitable opening in a console support surface 52. A nut 17 is threaded unto bolt 18 and secures the fixture 50 to surface 52.

Located in the bottom of container 10 is an opening 55 that is similarly shaped to the configuration of fixture 50, which opening 55 is adapted to receive fixture 50. In this particular instance the shape of fixture 50 is hexagonal as is clearly shown by the top view of FIG. 2. Other shapes, however, will serve equally as well, and will not depart from the principles of this lock/release fixture invention.

Fixture 50, hexagonal in shape, fits with another mating hexagonal recessed female opening 55, FIG. 1, which opening is centrally located through the bottom of a cup-receiving outer container 10 fitting over nut 50. Bottom surface 53 of the female hexagonal opening 55 is bevelled inwardly from below so that the male hexagonal nut 50 may readily be self-centering when female opening 55 is seated over a mated male nut 50.

Figure 2:
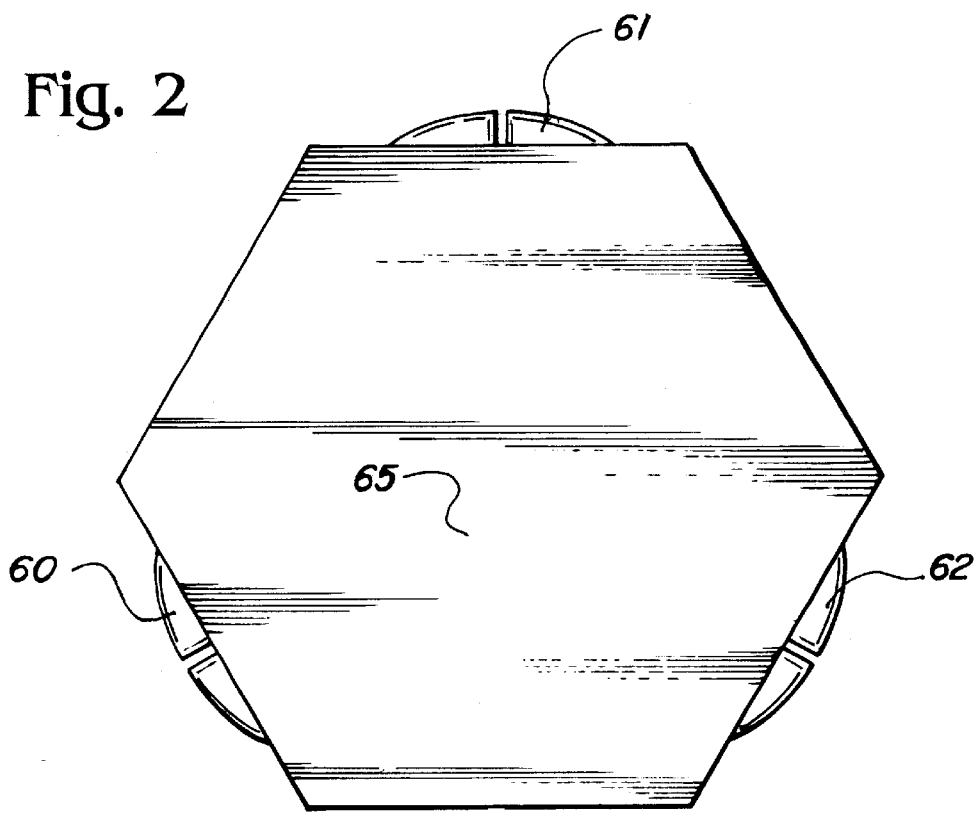
FIG. 2 shows a top view of a hexagon-shaped object holding fixture in accordance with the invention.

FIG. 2 shows three pairs of spring-loaded striker keepers 60, 61, and 62 spaced equally around the top casing 65. Fixture 50 should include one or more pairs of such striker keepers. These keepers 60, 61 and 62 all have inclined facing surfaces 63, FIGS. 1 and 3, which surfaces are inclined downwardly from above. Surfaces 63 are thus adapted to slide along correspondingly inclined surfaces 53, FIG. 1, located at the bottom of female opening 55. Such reverse inclined surfaces 53 and 63 assure both a smooth lock and a smooth release for the fixture of this invention.

When a user places a container 10 on fixture 50, FIG. 1, the opposite directions for inclined surfaces 53 and 63 allow the spring loaded striker keeper pairs to slide rearwardly (inwardly) and then automatically return in a forward direction in order to self latch container 10 to fixture 50. This self latching step holds the mug 10, FIG. 1, in a non spillable condition until it is released by the user.

In order to release the container 10, a user turns the container about ⅛th of a turn in either a clock-wise or a counterclockwise rotational direction. Such a user-initiated turn, in either direction, in a manner described in more detail below, conceals the striker keepers into the casing of fixture 50 thereby unlocking the container 10. When unlocked, container 10 may be removed from the holding MUG NUT™ 50.

Figure 3:
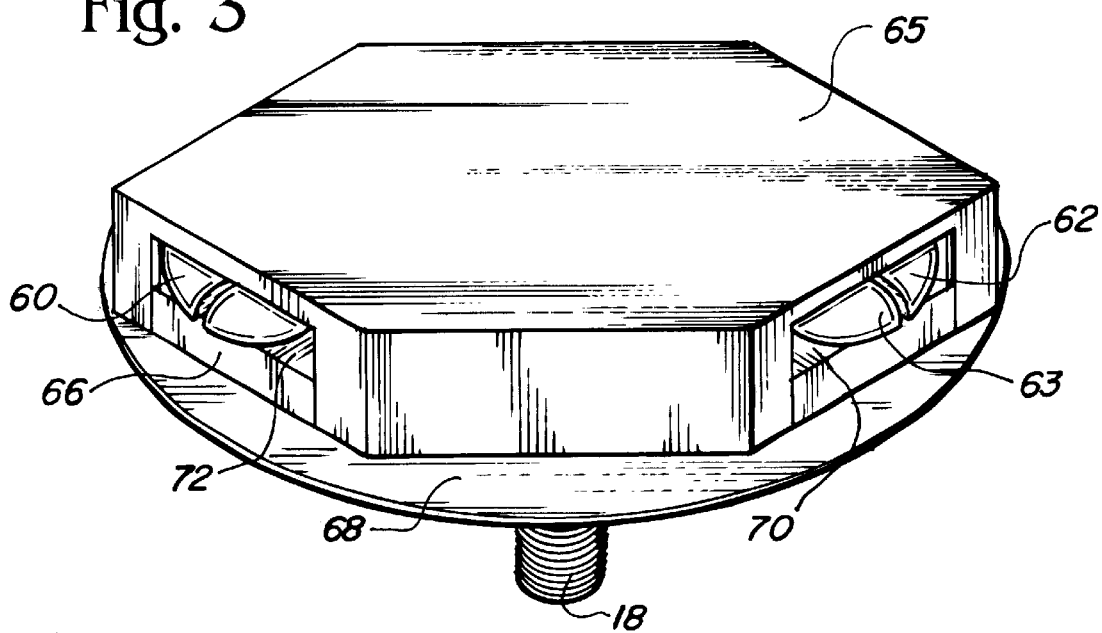
FIG. 3 shows a front perspective view of the fixture of FIG. 2.

Three spaced pairs of self-locking, spring-loaded, divided keepers are carried within the male nut, and together these releasably grasp the bottom of container at three spaced gripping points when a user sets a container over the MUG NUT™. FIGS. 2 and 3 clearly show that all of such striker keeper pairs slightly protrude outwardly from suitable openings 70 and 72 located in the side walls of the hexagonal-shaped casing 65.

Returning to FIGS. 2 and 3, one will note that such keeper pairs are shaped with a gradually rounded surface from a leading point to the broader edges toward the sides of openings 70 and 72. Such a rounded shape may be altered slightly, however, to include triangular shaped divided keeper pairs. In any event, however, these keeper pairs are centrally mounted and are separated from each other at equal distances around the casing 65—in the depicted case of FIG. 2—about 120 degrees apart. Such spacing provides a smooth clean three-point grasp of opening 55 in the bottom of a mug 10, for example. Theses three spaced points assure a firm and secure lock on container 10.

Upper casing 65 is fitted to a lower casing 66, FIG. 3, and these two casings 65 and 66 are snapped or otherwise affixed together to form an upper and lower cover for the springs, keepers, mounting platform and other operational details which will be described in more detail hereinafter. Top and bottom hexagonal shapes 65 and 66 form the top and bottom "buns" of a sandwich; and the "meat" in the "sandwich" are the springs, keepers, mounting platform, etc. The "bun" rotates around a fixed platform 68 secured to a support surface such as 52 of FIG. 1. At this point a brief discussion of the exploded view of FIG. 4 is believed helpful in understanding the various components of, and functions provided by, this invention.

Figure 4:
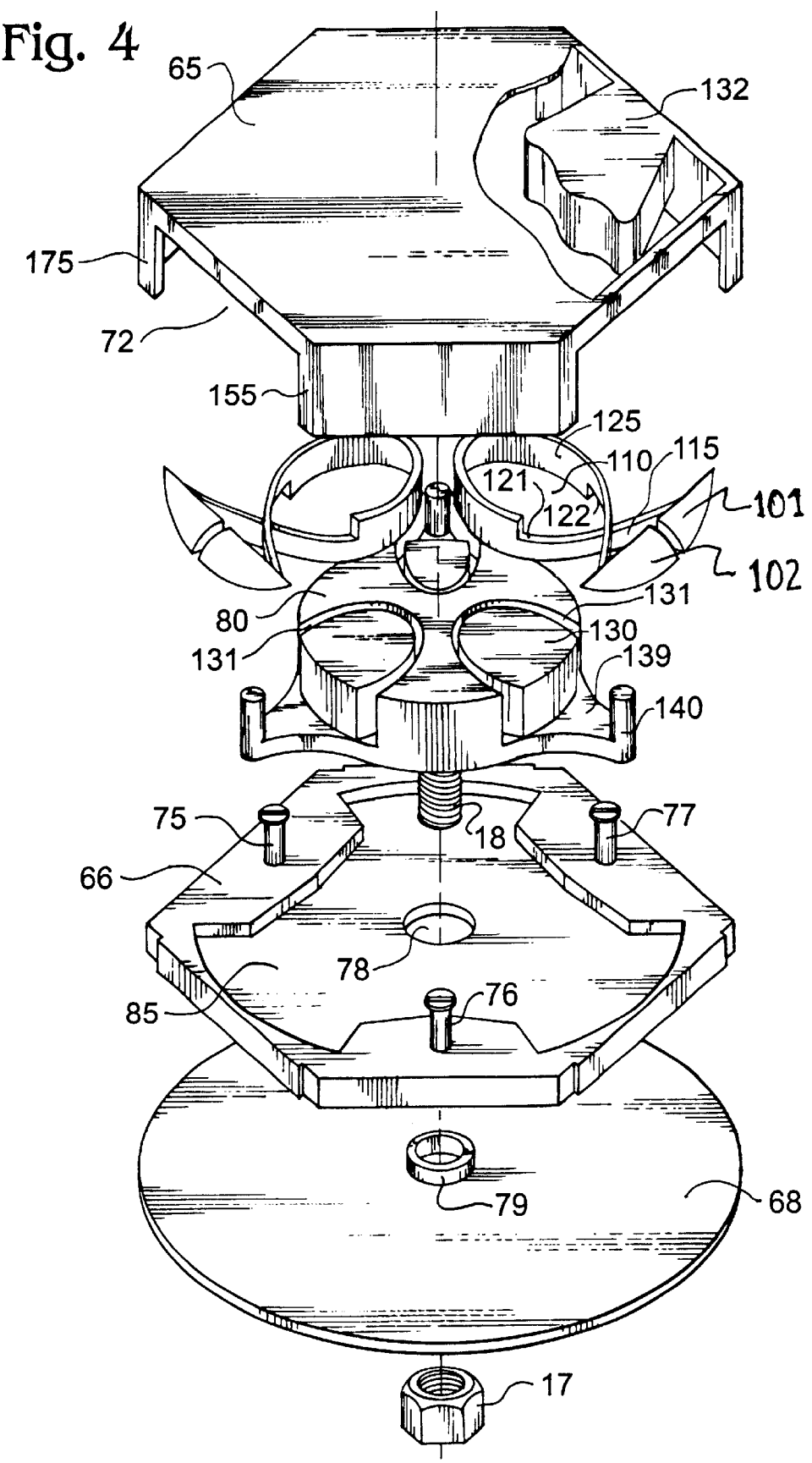
FIG. 4 shows an exploded view of an object holding fixture of the invention.

FIG. 4 shows an uppermost casing 65 exploded away from a lower casing base 66. Casing cover 65, and base plate 66 are held together by snap pins 75, 76 and 77. Lower base 66 has a central oversized opening 78 selected large enough to rotatably house spacer stub 79 through its center. A spring mounting platform 80 having a downward depending bolt 18 centered thereon is mounted above and seated through lower casing plate 66. Platform 66 carries spacer stub 79 in order to assure that the assembled "buns" 65, 66 can freely rotate around the upper surface of platform 66 while the spring mounting platform 80 remains stationary.

A recessed landing 85 is located in the top surface of lower casing 66. This recess 85 is shaped to receive the underside of the fixed spring mount platform 80 with a depth chosen to provide a smooth upper surface plane for springs, such a spring 125 when platform 80 has been seated in recess 85. Recess 85 thus allows for spring flex and cam movement as needed to overcome bias tension formed within spring 125.

FIG. 4 also shows two of three spings 125 exploded away from housing grooves 131 in base 80. One may consider spring 125 as originally being in the shape of a split circle with keeper halves 101 and 102 located at a dividing cut through that circular spring. That circle is then folded back upon itself to form a divided figure 8-shaped spring 125 which has both a larger overlapped loop 110 and a smaller, open ended loop 115. This figure-8 spring configuration is held in place by a stop pin 140 molded on mounting platform 80. A split spring 125, as will be described, allows the spring to compress for user-initiated holding and/or release of any suitable object when the object is turned bi-directionally.

Spring 125, in the figure eight overlapped configuration of FIG. 4, includes an inwardly stepped pair of mutually facing spring cut out notches 121 and 122 located along the overlapping area. These cut out sections allow the overlapped spring loops 110 and 115 to freely move without binding during expansion or compression of spring 125. Loop end 115, as shown, is not truly closed; but, rather, is an overlapped loop which becomes progressively smaller or larger as intersecting sections 121 and 122 override one another during a lock and/or release operation as will be described further hereinafter.

Figure 5:
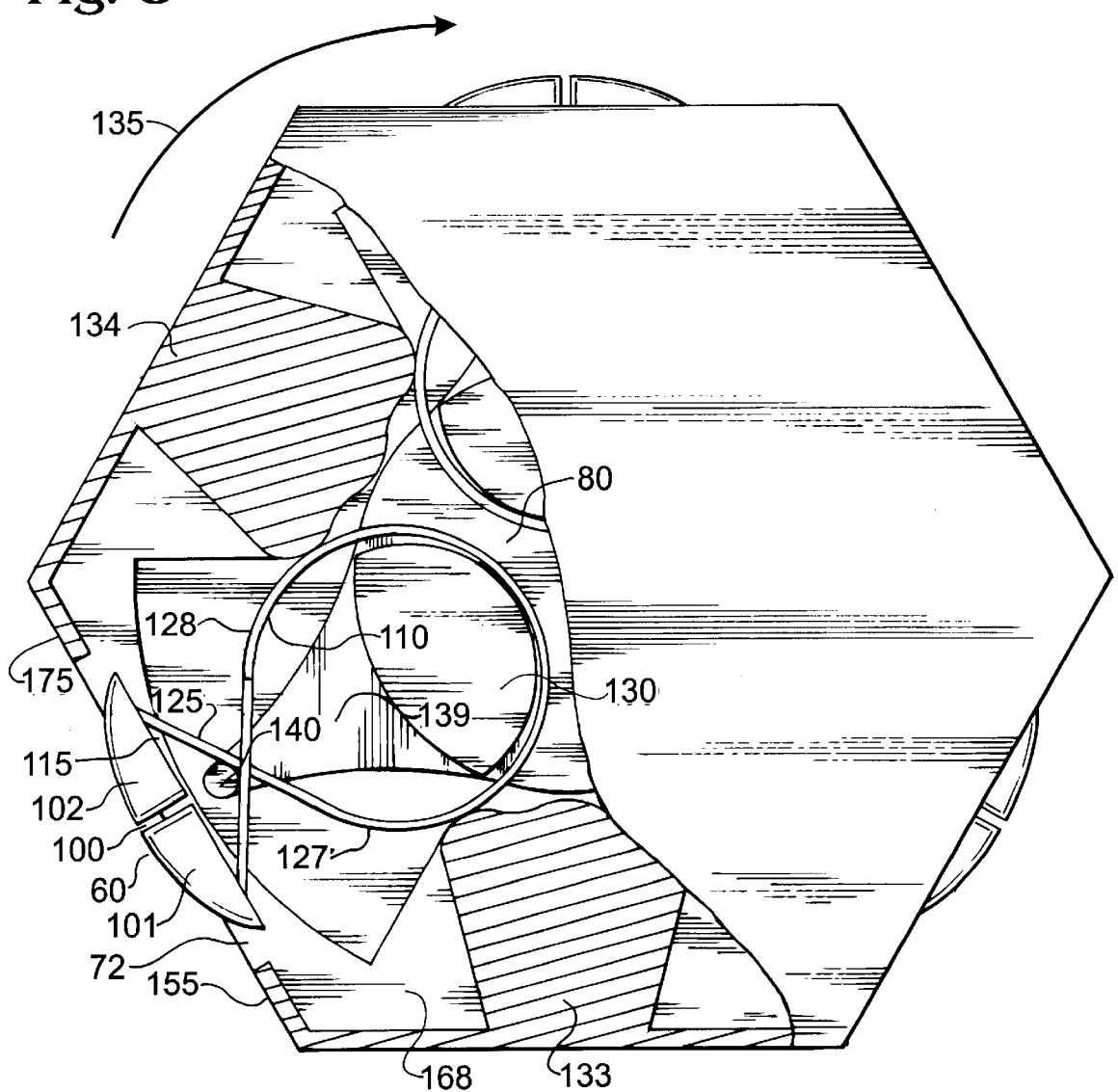
FIG. 5 shows a top view with a part of the casing cut away to reveal spring, cam and keeper pairs for one direction of rotational release in accordance with the principles of the invention.

The invention may be understood by a more detailed study and operational review of one keeper pair 60, since the functioning of all of the keeper pairs is basically the same. Refer to the top assembled cutaway view of FIG. 5. In FIG. 5, casing 65 has been partially cut away for full exposure, in an assembled position, of a pair 60 of the three split striker keeper pairs 60, 61 and 62 (See FIG. 2.) Side walls 175 and 155 may be varied as needed to adjust the size of the opening 72 for exposure of the keeper pairs 60, 61 and 62.

Keeper pair 60 is split at 100 into two symmetrical halves 101 and 102 held in bias by stop pin 140 at the open-ended loop section 115. Both spring loops sections 110 and 115 compress as striker edge 53, FIG. 1, hits both keeper halves 101 and 102 when container 10 is placed onto fixture 50 (See FIG. 1). Spring 125, FIG. 5, thus allows both keeper halves 101 and 102 to temporarily move away from stop post 140. Under downward urging of an object, both halves 101 and 102 move inboard; and, such keepers after striker edge 53 drops below the pair, 101 and 102. Those keepers thereafter automatically return to a locking position which holds container 10 in a non-spillable position.

Spring 125, FIG. 5, also includes a pair of lazy eight sides 127 and 128, which sides form an overlapping intersection for the two loops 110 and 115. Such lazy sides serve as follower surfaces for a pair of cams 133 and 134, which cams are formed into or otherwise attached to the casing cover 65 or bottom casing 66, as shown by the exploded view of FIG 4. (cover 65 in FIG. 4 includes a cutout section in order to more clearly depict that a cam surface 132 may be integrally formed in the casing 65.)

It will be appreciated that the mounting platform 80, FIG. 5, holds the compressed spring 125 in a fixed position, and the cover 65, or sandwich, rotates around the fixed platform 80. Cams 133 and 134, FIG. 5, are adapted to overcome the compressive force of spring 125 during a turn release, and thus serve to collapse either lazy side 127 or lazy side 128 of spring 125, depending upon the direction of cover rotation.

Assume with reference to FIG. 5, for example, that the cover is rotated clockwise as shown by arrow 135 in order to release container 10, FIG. 1. As cover 65 is rotated in the direction of arrow 135, cam 133 rides against spring side 127. Side 127 is forced back into the cover's interior and keeper 102 separates and moves away from its original side-by-side position with keeper 101. Thus, the overlapped end-loop 110, is made smaller as the cover 65 turns clockwise and keeper sections 101 and 102 recede into cover 65. This rotation compresses spring 125 and begins to overcome some of the holding contact on container 10.

Area 139, FIG. 5, between stop post 140 and island 130 is a flexing space that allows the overlapped loop 110 to contract or expand during the lock/release operation. Likewise in the top view of FIG. 5, flex area 168 is provided in order to allow the stationary keeper-mounted end 101 of spring loop 115 to be fully concealed within casing 65. Rotation in the opposite direction is shown in FIG. 5A and such rotation again makes use of areas 139 and 168 for keeper flex and concealment. Such concealment takes place during the camming and/or turning and/or release operation required for releasing a held object, such as container 10.

Once the held object has been removed, spring 125 automatically returns casing 65 to its original condition and restores keeper pair 101 and 102 to a side-by-side position where they are again available for the next self locking operation. FIG. 5A shows the operation for a counterclockwise movement where cam 134 pushes against loop 110 causing striker 101 to retract, and casing 65 rotates over and conceals striker 102.

Thus, rotation in a counter clockwise direction, see FIG. 5A, moves cam 134 against side 128. As earlier described, such camming moves both halves of the divided striker keeper pair into an unlocked and stored position within the rotated covering cap 65. When the object has been removed, the casing moves back by way of force from spring loop 110 against cam 134.

Figure 7:
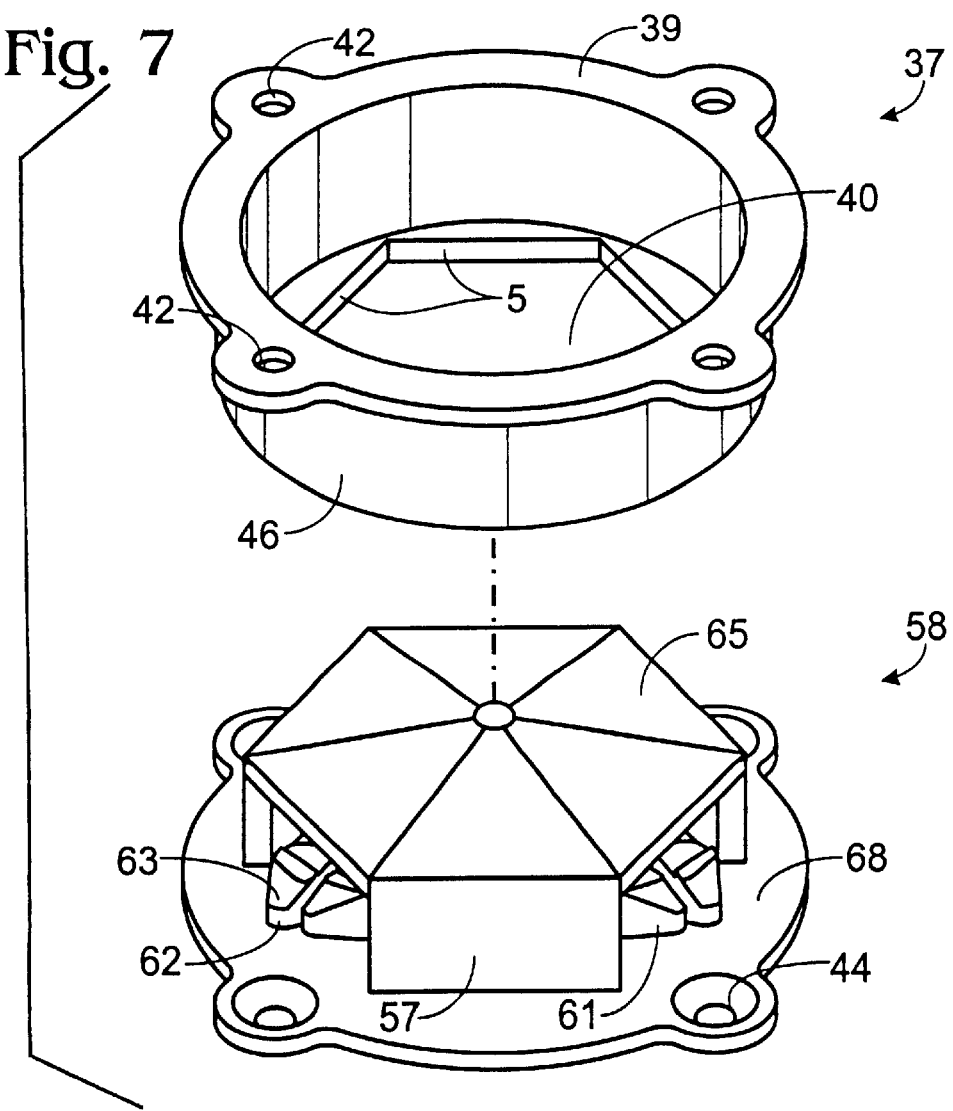
FIG. 7 shows a front perspective view of two major sub assemblies of another embodiment of my invention.
Figure 8:
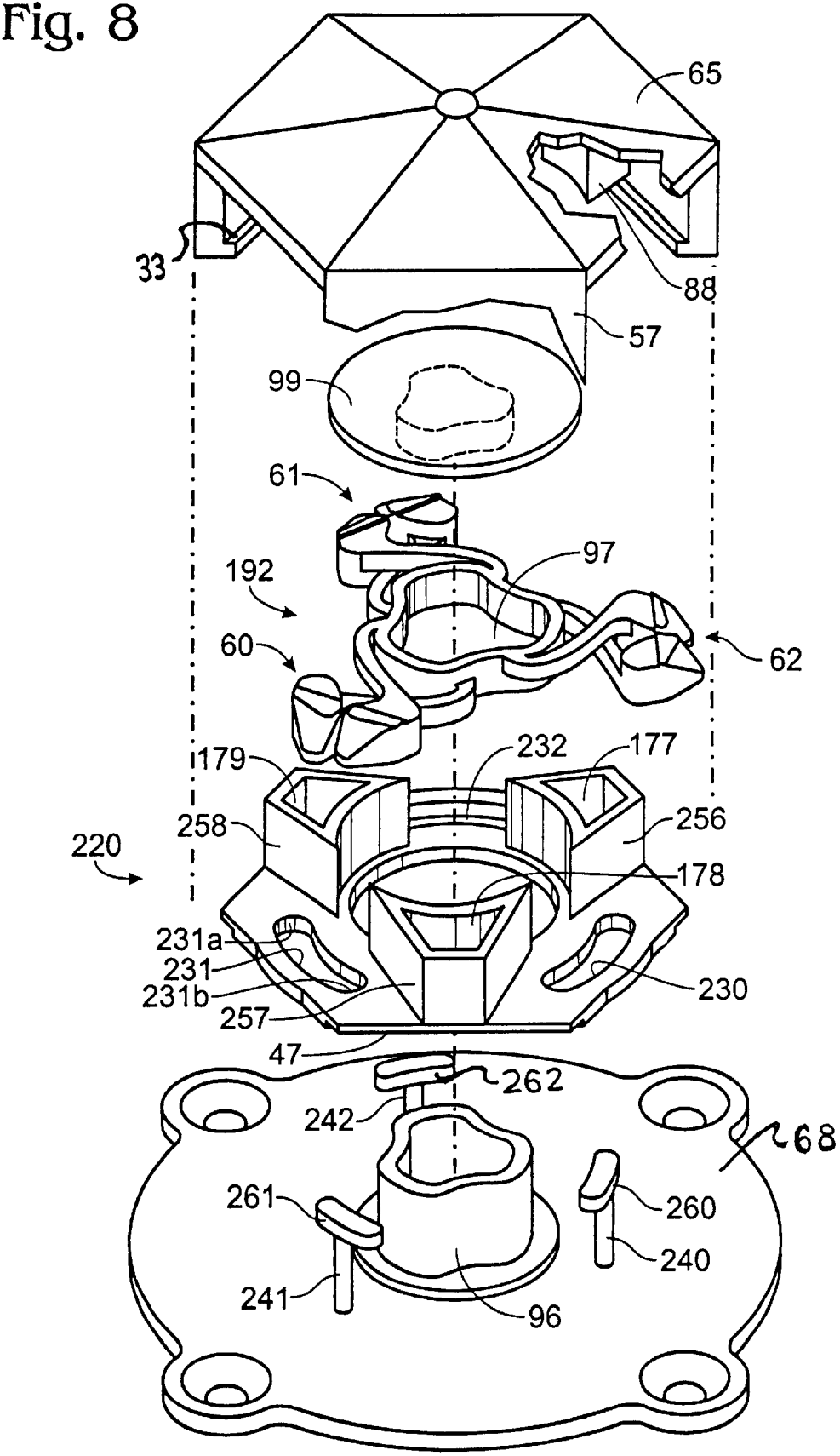
FIG. 8 shows an exploded view of an object holding fixture of the invention of FIG. 7.

In the foregoing embodiment my inventive locking nut assembly mated with an integral part of a cup or like compatible object. Turning now to FIG. 7, I have shown another, more universal embodiment in perspective view for purposes of explanation. My invention is shown in its simplest operational form as an object holding part 37 and a locking nut assembly 58, the latter being described in more detail hereinafter with reference to an exploded view as shown in FIG. 8.

In operation, these two male/female mating parts are referred to as mounting puck 37 and locking nut assembly 58 of FIG. 7. For brevity sake, only one section of a symmetrical three-section locking nut 58 will be described. The remaining sections will be understood from this one description and the foregoing description as applied earlier to my other embodiments of FIGS. 1 through 6.

Puck 37 of FIG. 7 is configured with a flat mounting surface 39, wall 46 and a bottom opening in the shape of a female hex 40. Although shown as an open cylinder flange, mounting surface 39 could be continuous, and may be supplied with a plurality of holes 42 for permanently affixing thereto any particular desired object such as a toy, work piece, electronic equipment, shipboard device or the like.

Cylindrical side wall 46 may, of course, take other shapes, but is present for structural and height clearance purposes. Additionally, wall 46 may vary in height for different applications. Wall 46, however, is generally selected to have a height that is taller than locking nut 58 so as to allow the two parts to mate and unmate as locking and release takes place when striker edge 53, FIG. 1, passes below the lower lip of the keeper pairs.

Operationally, locking nut 58 may be permanently affixed to any suitable surface via suitable screws (not shown) passing though mounting holes 44 in base plate 68. Lock nut assembly 58 is further comprised of a tower cover, or cap, 65 which hides and protects the moveable split pawl pairs 60, 61 and 62 (shown more clearly in the exploded view of FIG. 8).

Referring to the exploded view of FIG. 8, it should be understood that center plate 220 is rotatable and free to move in a clockwise or counterclockwise arc. The rotational arc is constrained only by the limits of arcuate slots 230, 231 and 232. These arcuate slots include stop limiting shoulders 231a and 231b which shoulders engage a corresponding upright pedestal, such as 240, 241 and 242. Such pedestals are fixed extrusions from base plate 68.

Additionally, center plate 220 is extruded with three equally spaced and shaped, raised cams 256, 257, and 258. These cams provide the mechanical leverage for unlocking by rotation, and are explained further in FIGS. 10 through 12.

Continuing our description upwardly on FIG. 8, a multi-legged striker keeper insert (hereafter referred to as a spider) 192 is shown in its operational configuration. Digressing momentarily to FIG. 9, spider 192 is presented in its "at rest" state as it would be upon removal from an injection mold during the manufacturing process, and, prior to formation into the installed and working configuration of FIG. 8. Spider 192 is shown comprised of three pairs of specially shaped legs 202 and 203 with larger, shaped feet 212 and 213.

Figure 9:
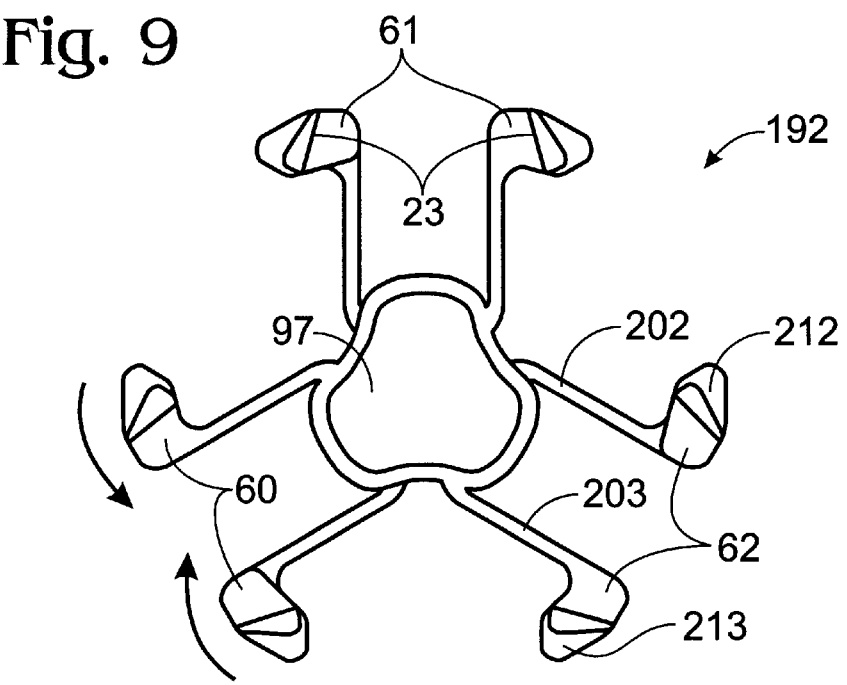
FIG. 9 is a top view of a spider shaped spring element in its natural, at rest, shape as it would be released from a typical injection mold process.

In an operational condition, legs 202 and 203 (FIG. 9) are crossed over each other, causing the inclined feet 212 and 213 to take positions opposite those shown in FIG. 9, but operationally positioned as shown in FIG. 8. Each of the other leg and feet pairs are similarly configured, and thus result in three cross-legged pawl pairs 60, 61, and 62 of FIG. 8. This operational configuration makes the feet and legs function as three pairs of split pawls which are moved apart and concealed by casing 65 during object rotation.

In assembled configuration, the three split pawl pairs 60, 61 and 62 nest in the housing slots located between raised cams 256, 257 and 258. Also, each pawl pair nests around pedestals 240, 241, and 242, and the pawl pairs are located under the lateral extensions provided by the T-shaped wings 260, 261, and 262 on the upward stop pin extensions 240, 241 and 242.

Returning now to FIG. 8 and continuing our description upwardly of the expolded view, keeper disk 99 has molded therein a downward depending lug (shown in dashed lines) which lug, after passing through slightly oversized opening 97 in spider 192, fits snugly into the top opening of receiver post 96 thereby further securing spider 192 for a limited arc rotational movement. Still moving upwardly in our description of FIG. 8, cap tower 65 is formed to be slightly domed, so as to provide a guide that allows mounting puck 37, FIG. 7, to appropriately drop into place on the MUG NUT™.

Extruded into the underside of cap tower 65 are three shaped male cam studs 88 (typical) which mate with the female receiving holes 177, 178, and 179 in cams 256, 257, 258. Further the tower wall(s) 57 are extruded within an inboard ridge 33 (FIG. 13) on the inboard side of cover 65. Such raised ridges snaps into an undercut groove, such as groove 47, shown in a forward directing lower edge of center plate 220. Such a snap fit completes a rotatable locking nut assembly.

Figure 10:
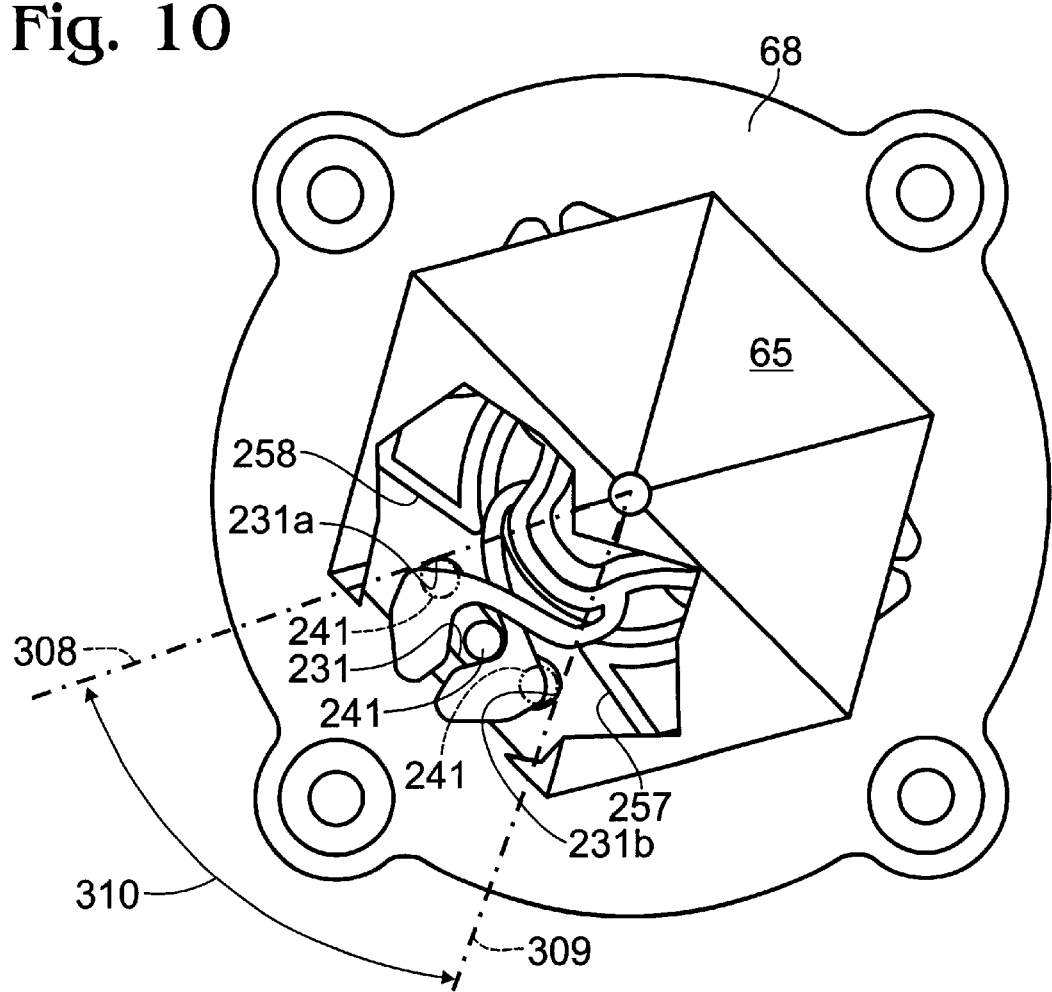
FIG. 10 shows a top and partial cut away view of a hexagon-shaped object holding fixture having arcuate limiting stops in accordance with another embodiment of my invention.

Moving on to FIG. 10, a top view looking down on the dome cover is shown. For clarity sake I have shown part of base plate 68 and the dome 65 in a cut away presentation. An "at rest" position for the split pawl pairs are assumed in this view. The cut away portion shows how the legs 202, 203 and feet 212 and 213 (Compare FIGS. 8 and 9) are overlapped for operation, and are seated underneath the T top 261 of post 241. Looking down one sees the arcuate slot 231 includes shoulders 231a and 231b that defines the arc travel limits 308 and 309. Double-headed arrow 310 symbolically indicate the bi-direction arc-limited rotation in either direction for object release.

Figure 11:
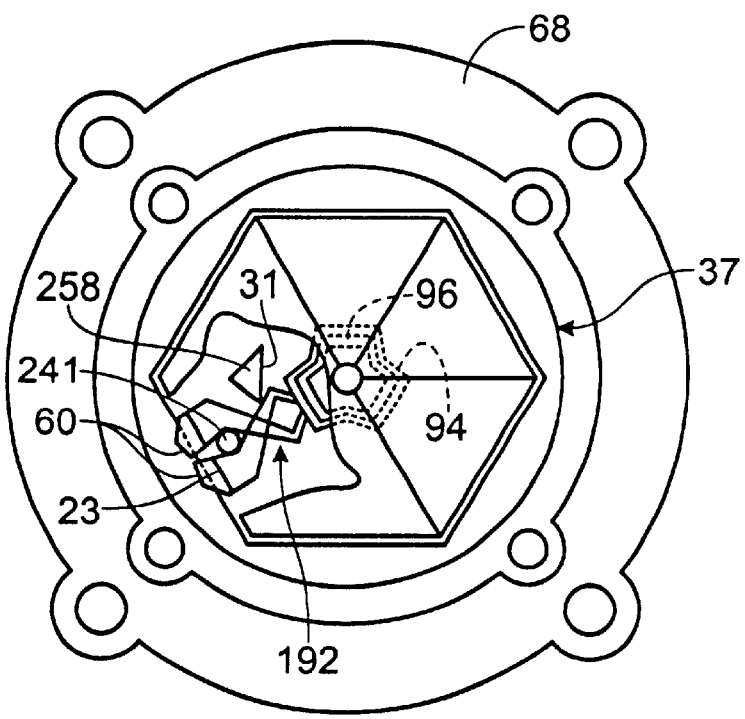
FIG. 11 shows a top and partial cut away view of a hexagon-shaped object holding fixture in accordance with the invention.

FIG. 11 shows a symbolic presentation of the device of my FIG. 10 in which the operation details have been simplified for explanation purposes. Edge 31 of cam 258 is simplified as a triangle which is just touching 202 in the "at rest"position. Further, in the "at rest"position, pawl pair 60 is fitted snugly around pedestal 241. Comparing FIG. 7 with FIG. 11, one may note that a space separates sides 5 from tower sides 57 as would be the case when the object attached to puck 37 is being held in a locked position.

Figure 12:
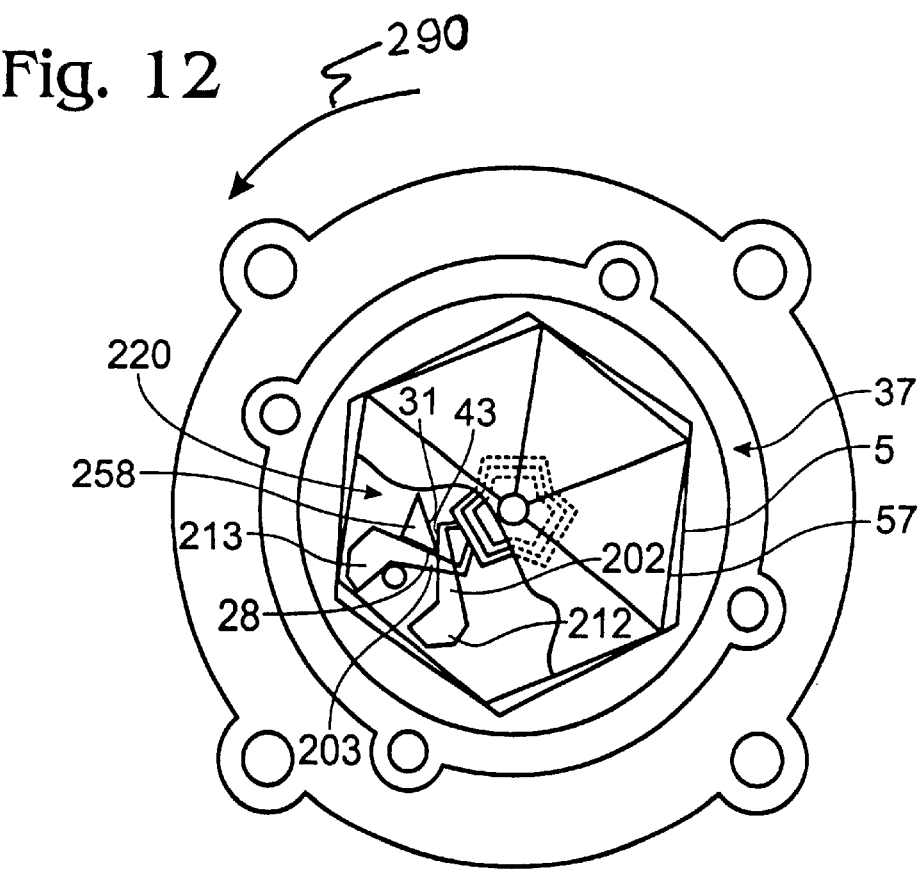
FIG. 12 shows a top and partial cut away view of a hexagon-shaped object holding fixture in a "rotated for object release" position for the FIG. 7 embodiment of my invention.

As shown in FIG. 12, puck 37 has been rotated—for example counterclockwise—for approximately a 20 degree arcuate movement as shown at arrow 290. Edges 5 or puck 37 are thus urged against hex sides 57 of cap tower 65 (FIG. 7), which tower 65, in turn, is attached to center plate 220. As center plate 200 rotates, cam 258 likewise correspondingly rotates. Thus leading edge 31 of cam 258 slideably presses against outboard edge 43 of leg 202, thus retracting leg 202 and foot 212 away from obstructing hex edges 5 of puck 37.

Note that back edge 28 of cam 258 bumps against leg 203 stopping rotation at exactly the correct point for clear removal of puck 37. At this point, leg 202 is heavily compressed. Upon removal of puck 37, the spring tension in leg 202 pops center assembly 220 back to an "at rest" position where the unit is ready to receive and self-latch another object.

Leg 203, on the other hand, is not affected by the above-described cam action, and corresponding foot 213 does not retract by the object rotation. Uniquely foot 213 is taken out of an obstruction position by simple simultaneous rotation of puck 37 apex having moved outward to a position sufficient to conceal foot 213 within tower 65. Hence one foot 212 is mechanically cam-retracted, and the other foot 213 is hidden by the apex of the hexes, thereby freeing the object holding puck 37 from obstruction for object removal.

In short summary, please note that the operating parts of the invention are redundant in three equally spaced axes, and the working components within each axis are mirror imaged duplicated thus providing equivalent operation in both arc directions of rotation. Thus my invention provides three cam to leg contact points which operate simultaneously for object release.

Figure 13A:
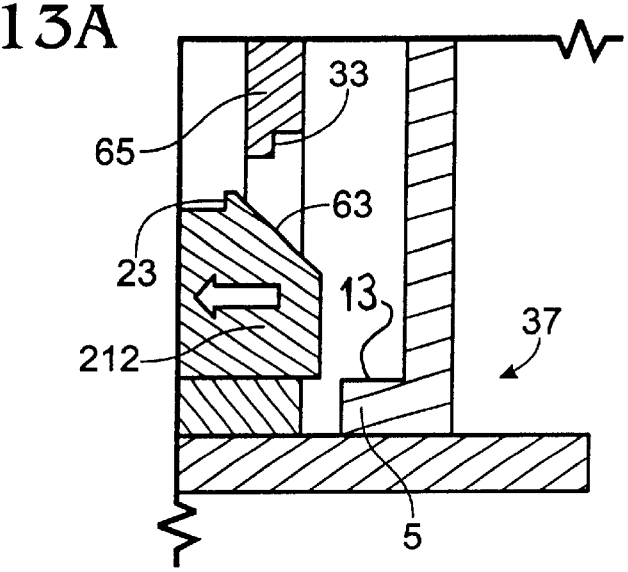
FIG. 13 shows an elevation, and partial sectional view of a lock/release fixture in accordance with a more positive lock embodiment of my invention.
Figure 13B:
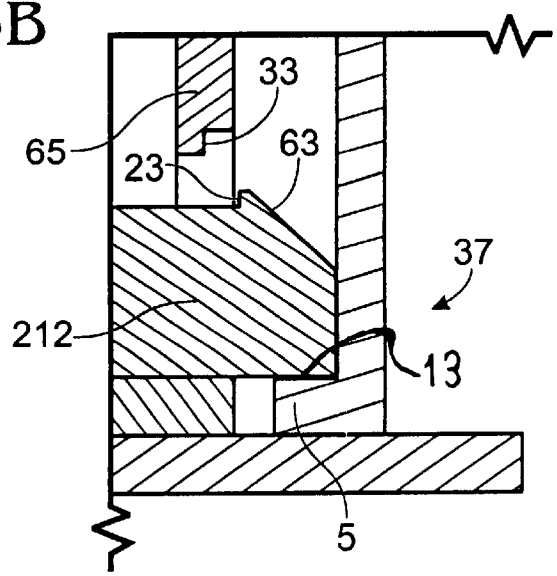
Figure 13C:
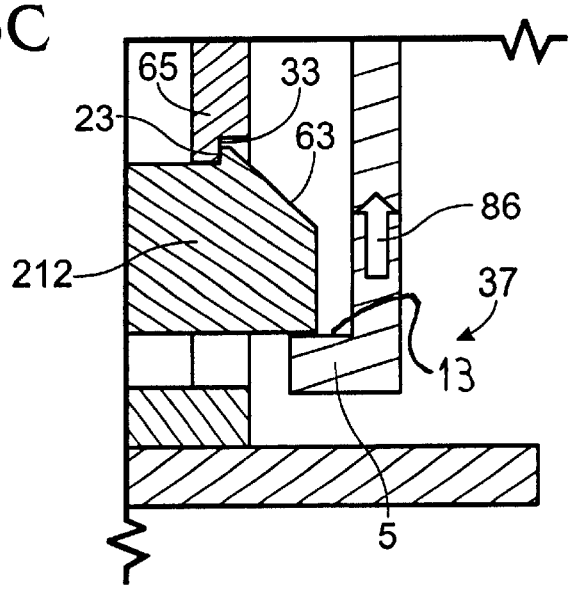

Turning now to FIGS. 13A, 13B, and 13C, I have shown the normal locking operation in 13A and 13B, followed by my ridge and notch safety catch at work in FIG. 13C. FIGS. 13A and 13B are believed to be self explanatory in view of the earlier descriptions and thus need not require any further explanation.

Turning now to FIG. 13C, I have learned that when an object is subject to heavy side loads, an upward moment 86 is created. Such a moment results in an inside edge of puck 37 deflecting downward slightly, while the bottom edge of foot 212 may concurrently deflect upward slightly. Both of these deflections result in slightly sloping surfaces, and such sloped surfaces acting together can translate to a sufficient inward force at foot 212 so as to create an accidental unlocking.

I have added a safety catch in the form of an upward raised ridge 23 in the top surface of the striker pair 212 and a receiving notch 33 in the downwardly depending lower edge in the tower openings such as 72, FIG. 4, which eliminates the potential. In the event of such increased loads, depicted by arrow 88, inside edge 13 of puck 37 first lifts foot 212. Should more forces result, and foot 212 begin slipping inward, ridge 23 catches and engages with notch 33, thereby stopping an accidental unlock.

It should be understood that the invention has been described with three symmetrical cam follower sections, but some object lock/release functions may require only one such section. Thus, for example, it is equally within the coverage of this invention to provide a lesser number of keeper pairs for a lock/bi-directional release object-holding function.

As an example, a work piece, or toy, may be self latched into a held position by pressing it down against the striker keeper pair 60. Then, when appropriate, that work piece may be simply and easily released by a turn of about ⅛th of a rotation of casing 65 in either direction. Other examples of applications for the principles of this invention will readily come to mind.

While my invention has been described with reference to a particular example of preferred embodiments, it is my intention to cover all modifications and equivalents within the scope of the following claims. It is therefore requested that the following claims, which define my invention; be given a liberal interpretation which is within the spirit and scope of my contribution to this art.

What is claimed is:

1. A self latching and self releasing object-holding fixture that both latches and releases an object in response to arc-limited rotational object movement, said fixture comprising:
    an object-receiving casing which is rotationally moveable with the object being rotated in either rotational direction through said arc-limited movement;
    a self-latching radially exposed and retractable split keeper in said casing, said keeper being inwardly moveable in response to an object being placed over said casing for self-latching the object; and
    said keeper being split into a two-section pair, with one section of said split keeper spreadable into said casing and the other section being concealable within the rotated casing itself for releasing the object in response to said limited-arc movement.

2. A self latching, object-holding fixture in accordance with claim 1 in combination with said object to be held/released, and said casing in said fixture further comprising:
    a particular given shape adapted to hold said keeper in a position for latching unto and releasably dis-engaging the object to be held; and
    an opening of a similar matching shape in said object for mating with said given shape of said casing and sized so as to allow the object to drop over and be seized by said keeper.

3. A self latching and self releasing, object-holding fixture in accordance with claim 2 and further comprising
    said given shape is a hexagon; and
    keeper retracting means spaced at equal angular distances around said hexagon.

4. A self latching and self releasing, object-holding fixture in accordance with claim 3 and further comprising:
    said casing is a six-sided hexagon, wherein said hexagon has side openings in three of said six sides for exposing, in each one of said three said side openings, a pair of said keepers.

5. A self latching and self releasing, object-holding fixture in accordance with claim 1 and further comprising:
    said keeper is spring loaded by a pair of crossed over legs having attached thereto a pair of spaced apart striker sections;
    said spring loading of said keeper being operable for holding said latched object securely to said casing by said spring loading;
    a spring holding base, anchored in a fixed position to a support surface; and
    said casing including cam contact with said spring loaded keeper and responsive to an arc-limited turn of said object for causing one or the other of said spaced apart striker sections to spread for concealment in said casing in accordance with the rotational direction that the latched object is turned.

6. A self latching and self releasing, object-holding fixture in accordance with claim 5 wherein said casing is rotatable and said fixture further comprises:
    a pair of spring compression cam surfaces located on said casing, and said cam surfaces are responsive to said object rotation for compressing the spring loading on one of said legs and thus releasably disengaging one of said spaced apart striker sections from the object being held.

7. A self latching and self releasing, object-holding fixture in accordance with claim 6 wherein said keeper includes a side-by-side spaced apart spring-loaded keeper pair and said fixture further comprises:

a mounting on said spring holding base, for slidably anchoring said pair or striker sections, with said pair having an exposed downwardly inclined striking edge; and means responsive to said object contacting said striking edge for allowing said pair of striker sections to slide inwardly together and then return after the object has passed over said striker sections so as to self latch said object in place over said casing.

8. A self latching and self releasing, object-holding fixture in accordance with claim 7 wherein said casing has a side opening and further comprising:

an upper inclined edge on both striker sections of said pair of spaced apart striker sections, said upper inclined edge projects through and extends slightly beyond said side opening in said casing;

a lower surface of said pair of striker section for latching said object to said casing after said pair of striker sections have retracted into and returned out of said side opening in said casing; and matching safety notch means in the upper surface of said striker sections and a lower surface of said opening for absorbing direct pulls on said object and guarding against inadvertent object release thereby.

9. A self latching and self releasing, object-holding fixture in accordance with claim 8 wherein matching safety notch means further comprises:

a raised ridge on the upper surface of said pair of striker sections and a correspondingly raised notch on said casing opening.

10. A self latching and self releasing, object-holding fixture in accordance with claim 8 and further having more than one pair of keepers spaced around the casing and projecting from opening therein; and said fixture further comprising:

each of said keeper pairs is spring loaded by being formed as crossed over spring loaded legs; and a fixed stop post anchored on said spring holding base and located against said crossed over spring loaded legs in order to place said legs in spring loaded tension.

11. A self latching and self releasing, object-holding fixture in accordance with claim 10 wherein said keeper pairs are three in number and said fixture further comprises:

said keeper pairs are molded in the form of a central hub with a plurality of pairs of said crossed over legs radiating outwardly from the central hub; and each adjacent pair of said legs being crossed over each other and bearing against said stop post in order to form a spring which urges said keeper pair in an extended position.

12. A self latching and self releasing, object-holding fixture in accordance with claim 11 and further comprising:

arc-limiting stops formed as shoulders of an arcuate movement limiter wherein said arc-limiting stops comes to rest against said stop post at the extremes of said arcuate movement.

13. A self latching and self releasing object-holding fixture in accordance with claim 12 and further comprising:

said keeper sections are biased such that they may move apart in either rotational direction as the casing turns so that the object may be self released from its locked position by a bidirectional and arc-limited movement of said object.

14. A self latching and self releasing object-holding fixture in accordance with claim 13 and further comprising:

a cam located within the casing, said cam is adapted to ride against one of said spring loaded keeper legs as the casing is rotated; and said casing itself acts as a concealing housing for storing the other keeper and its leg in an unlocked position relative to said object as the casing is turned for self release of said object.

15. A self latching and self releasing object-holding fixture in accordance with claim 14 wherein said spring loaded tension for said keeper comprises:

a loop spring formed from a pair of said legs and turned back upon itself into the shape of a figure eight, said figure eight shape configuration has an intersecting point between closed and split loop sections;

said closed loop section being located toward a center for said casing and said split loop section being located outboard near a peripheral opening at an outboard edge for said casing;

said split loop spring section having a pair of ends, with each end of said pair of ends adapted to receive said keeper; and means affixing said one keeper respectively of said keeper pair to one end each of said end pair of said split loop section such that said keeper pair is exposed beyond a forward edge of said peripheral opening in said casing.

16. A self latching and self releasing object-holding fixture in accordance with claim 15 and further comprising:

means for fixing said holding spring base on a support surface;

said stop post on said base located just beyond said intersecting point of the spring forming said figure eight shape, said stop post both compresses said spring and positions two opposed bias arms of said split loop spring section with sufficient spring-loaded tension that the individual split keeper of said keepers pair are normally biased together in side-by-side fashion.

17. A self latching and self releasing, object-holding fixture in accordance with claim 16 wherein the figure eight spring shape has spring-loaded tension stored therein, which tension tends to hold said keeper pair together, and said fixture further comprises:

flexing space for the closed end of said spring such that, as the object is turned in either one of two possible directions, the closed loop end of said figure eight shaped spring compresses inwardly upon itself; and said inward compression overcomes the spring-loaded tension on said keeper pair sufficiently that the object is freely self released from its locked position on said casing.

18. A self latching and self releasing, object-holding fixture in accordance with claim 1 wherein said object is a container, and said fixture further comprises:

a travel mug container having a locking opening at a base of said container thereof for receiving said keeper.

19. A self latching and self releasing, object-holding fixture in accordance with claim 18, and said fixture further comprises:

an insert for placement in said travel mug container to adapt said container for holding mug, a bottle or a can.

20. A self latching and self releasing object-holding fixture that self latches an object having a striker plate into a locked position and self releases said object when the object is turned slightly in either direction, said fixture comprising:

at least one pair of divided spaced apart striker lock/release keepers that are slidable as one unit into a locking engagement position relative to said striker plate of said object for position locking said object;

a compression spring normally biased to hold said keeper pair in engagement with said striker plate, which said keeper pair are spreadable for spaced apart disengagement from said striker plate in order to thereby release said object;

a rotatable casing covering said spring and keeper pair when said keeper pair are spread for release of said object; and means responsive to a turn applied to the locked object in either a clockwise or counter clockwise direction for spreading such divided keeper pair sufficiently far apart to release said locked object.

21. A self latching and self releasing object-holding fixture in accordance with claim 20 wherein said compression spring further comprises:

a figure eight shaped configuration having a closed collapsible loop located toward a center for said casing and a split spreadable loop located outboard near a peripheral opening in said casing;

means connecting said keeper pair to the ends of said split loop, said keeper pair exposed beyond a forward edge of said peripheral opening in said casing for self locking said object in said locking engagement position;

a cam;

a support base; and means mounting said cam on said support base for compressing said compression spring with sufficient tension that the split keeper sections are normally biased together in side-by-side fashion for back and forth sliding movement during self locking and for transverse spreading movement and concealment within said rotatable casing during self release.

22. A self latching self releasing, object-holding fixture in accordance with claim 21 and said support base further comprising:

flexing space in said casing for concealing said keeper pair therein as said figure eight shaped spring is collapsed sufficiently to overcome the locking spring tension on said keeper pair.

23. A self latching self releasing, object-holding fixture in accordance with claim 22 wherein said keeper pair is responsive to spring loading on the striker keeper pair, and said fixture further comprises;

beveled edges on said keeper pair for self latching with a striker plate on said object;

said spring loading and said beveled edges allowing said keeper pair, as said striker plate passes beyond a tip of the keeper pair, to automatically slide rearward and return to a forward position in response to contact between said striker plate and said keeper pair; and said fixture is thereby self-latching to hold an object to be locked in a locked position on a support surface.

24. A method of self latching an object to an object-holding fixture, which fixture has at least one divided striker lock/release keeper pair for backward and forward sliding movement for self locking said object and for limited arcuate rotational movement for releasing said object, said method comprising the steps of:

dividing a keeper pair into first and second keeper halves;

moving said keeper pair as one unit backward and forward in response to downward movement of said object in order to lockably engage said object to said fixture;

limiting the arcuate rotational movement of said keeper pair by limiting stops, said limiting stops defining a predetermined arc of rotational movement allowed said object; and releasing said object by the additional steps of:

concealing one keeper half of said keeper pair within a casing housing while concurrently camming the other of said keeper pair by said predetermined arc movement of said object to free the engagement of said object from said fixture.

25. The method of claim 24 wherein a side load on a held object causes a moment arm force which may result in breakage of said fixture, and the method of lessening said breakage comprises the additional steps of:

forming T-shaped anti-torque wings on the top of a stop post which limits the amount of arcuate rotational movement of said object;

locating said stop post directly on a mounting base for the fixture; and positioning said keeper pair(s) under said anti-torque T-shaped wings of said stop post.

26. The method of claim 24 wherein direct pulls on a latched object creates flexing of said keeper halves, said flexing tending to force said halves apart and prematurely drawing said keeper halves within said casing such that an unintended object release may take place, and the method of lessening said unintended release comprises the additional steps of:

forming mating notch and ridge interlocks on the upper surface of said keeper halves and the lower surface of a casing opening from which said keeper halves emerge for said interlock; and causing said interlocks to become mutually engaged during a direct pull or side loads on said object.

* * * * *